United States Patent [19]

Yasukawa

[11] Patent Number: 5,481,326

[45] Date of Patent: Jan. 2, 1996

[54] CAMERA DATA COMMUNICATION DEVICE

[75] Inventor: Seiichi Yasukawa, Kawasaki, Japan

[73] Assignee: Nikon Corporation, Tokyo, Japan

[21] Appl. No.: 442,148

[22] Filed: May 16, 1995

Related U.S. Application Data

[63] Continuation of Ser. No. 273,601, Jul. 12, 1994, abandoned, which is a continuation of Ser. No. 151,768, Nov. 15, 1993, abandoned, which is a continuation of Ser. No. 745,194, Aug. 15, 1991, abandoned.

[30]     Foreign Application Priority Data

Aug. 29, 1990   [JP]   Japan ..................................... 2-225240

[51] Int. Cl.⁶ ..................................................... G03B 17/00
[52] U.S. Cl. ...................................... 354/286; 354/289.12
[58] Field of Search ................... 354/286, 289.1–289.12, 354/484, 127.12

[56]             References Cited

U.S. PATENT DOCUMENTS 4,737,812   4/1988   Hasegawa et al. ...................... 354/286
5,063,403  11/1991   Yokonuma et al. ..................... 354/484
5,117,251   5/1992   Ishimura et al. ........................ 354/484

*Primary Examiner*—David M. Gray
*Attorney, Agent, or Firm*—Shapiro and Shapiro

[57]                    ABSTRACT

In a camera data communication system for performing data communication operations between a detachable external accessory and a camera body through a data communication line (or lines), and for performing data communication operations between a camera data communication device and a circuit unit in the camera body, through the data communication line (or lines), a voltage level detector generates a malfunction signal which indicates a malfunction when the voltage level of the data communication line is abnormal, before the start of a data communication operation, and a control portion inhibits data communication operations in response to the malfunction signal.

47 Claims, 8 Drawing Sheets

CAMERA DATA COMMUNICATION DEVICE

This is a continuation of application Ser. No. 08/273,601 filed Jul. 12, 1994, which is a continuation of application Serial No. 08/151,768 filed Nov. 15, 1993, which is a continuation of application Ser. No. 07/745,194 filed Aug. 15, 1991, all now abandoned.

BACKGROUND OF THE INVENTION

1. Field of the Invention

The present invention relates to a camera data communication system for performing data communication operations between a detachable external accessory and a camera body through a data communication line (or lines) and for performing data communication operations between a camera data communication device and a circuit unit in the camera body through the data communication line (or lines).

2. Related Background Art

Various kinds of accessories attached to a camera, such as an interchangeable lens, a speedlight and a data back, have been manufactured, and there has been a recent tendency to provide these accessories with many functions in order to achieve more advanced control operations when the accessories are combined with the body of the camera. For that purpose, it is necessary to electrically connect the camera body and the accessories to each other and to transmit and receive various kinds of data by serial data communication.

Furthermore, there is a general tendency for a CPU serving as a nucleus inside the camera body to exchange data with internal units, such as an EEPROM for performing nonvolatile storage of set information and a driver IC for driving a display, by serial communication. Therefore, it is required that the CPU in the camera body be able to execute serial data communication with a plurality of other internal units and with accessories in order to transmit and receive information necessary for control operations.

Although it is preferable in the above serial data communication that the CPU itself have many communication lines, the number of the lines is generally limited. Therefore, basic lines, such as synchronizing clocks (in the case of synchronous communication), a data input and a data output, are connected in a row to all of the other internal units and to the accessories. A signal for selecting one of these internal units and one of the accessories is generated for each of the accessories or the internal units, and thereby only the selected unit or accessory can use the communication lines. The CPU in the camera body thus communicates with all the other internal units and with the accessories during time sharing.

However, since the accessories are detachably mounted on the outside of the camera, contacts for electrically connecting the accessories and the camera to each other are likely to be exposed when the accessories are not attached to the camera. For example, a hot shoe contact for attaching a speedlight to the camera is always exposed, and a contact disposed in a mount for an interchangeable lens is also exposed when the lens is not attached to the camera during an interchange operation.

If an exposed contact is touched by a hand or splashed with rainwater, if contacts of the camera body and the accessory which do not correspond to each other are brought into contact with each other when the accessory is interchanged with another accessory, or if the contact is short-circuited to the camera housing, any of the above communication lines is short-circuited to the camera housing. This leads to incorrect recognition of the internal unit or the accessory corresponding to the short-circuited contact, and furthermore, hinders communication with the other internal units and the accessories because all the communication lines are connected in a row as described above.

As a result, the following two problems are likely to arise: first, communication with any of the accessories or internal units is made impossible, for example, when synchronizing clocks are short-circuited, and second, communication is formally valid, but transmitted and received data is not reliable at all, for example, when the data communication lines are short-circuited.

As regards the first problem, since communication is impossible and the camera does not operate at all, the user can notice that a malfunction of the camera has occurred and take some corrective measures. However, as regards the second problem, the camera outwardly looks normal, but transmitted and received data is not reliable at all. Since the camera or the accessory continues to operate based on incorrect information, the user will continue taking pictures without being aware of the malfunction until after the pictures are developed. This second problem is thus worse than the first one.

SUMMARY OF THE INVENTION

An object of the present invention is to provide a camera data communication system capable of preventing a camera from performing incorrect control operations which the user does not notice even if one of the contacts for external accessories is short-circuited.

In order to achieve the above object, according to one aspect of the present invention, a data communication system comprises a voltage level detection means for generating a malfunction signal which indicates a malfunction when the voltage level of a data communication line is abnormal before the start of a communication operation, and a control portion for cancelling the subsequent communication operations if a malfunction signal is output from the voltage level detection means.

According to another aspect of the present invention, the data communication system comprises a warning means for warning the user when the malfunction signal is output from the voltage level detection means.

According to a further aspect of the present invention, the data communication system comprises a release prohibition means for prohibiting a shutter release operation of the camera when the malfunction signal is output from the voltage level detection means.

According to the present invention, since no communication operation is performed after a malfunction is detected, a control operation which only outwardly looks normal is not carried out.

In addition, according to the present invention, since a warning is given when a malfunction is detected, the user can be made aware of the fact that the malfunction is occurring.

Still further, according to the present invention, since a shutter release button is locked when a malfunction is detected, incorrect photographing is prevented.

DESCRIPTION OF THE PREFERRED EMBODIMENTS

Figure 2:
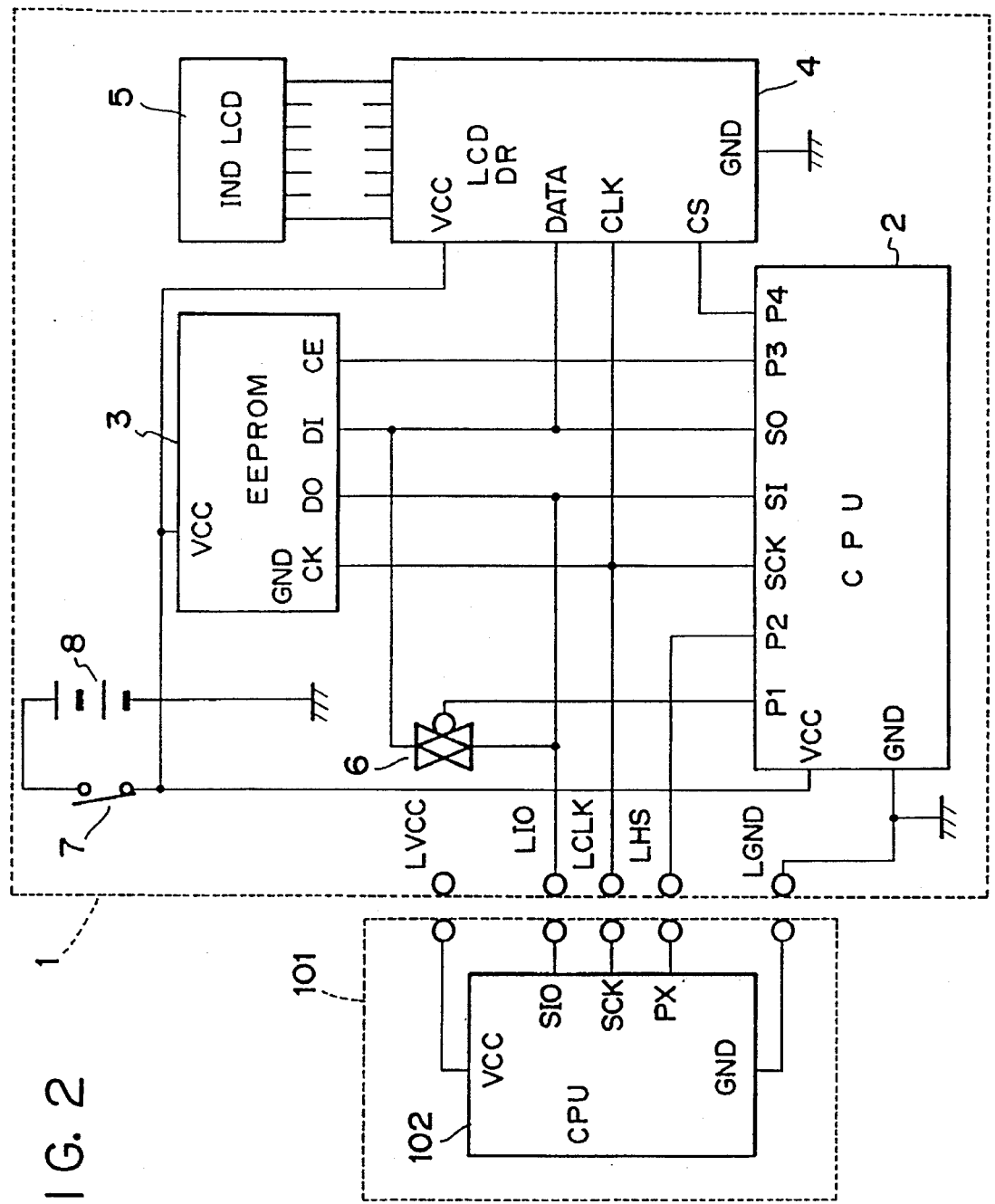
FIG. 2 is a block diagram of the embodiment.

FIG. 2 is a block diagram showing the construction of an embodiment of the present invention. Broken frames denoted by numerals 1 and 101 designate a body of a camera and an interchangeable lens as an example of accessories, respectively. When the interchangeable lens 101 is attached to the camera body 1, the interchangeable lens 101 and the camera body 1 are electrically connected through five lens contacts LVCC, LIO, LCLK, LHS and LGND of the camera body 1 and corresponding five contacts of the interchangeable lens 101.

In the camera body 1, a power supply 8 supplies electric power to a CPU 2 (data communication device) an EEPROM 3 (internal unit) and an LCD driver 4 (internal unit) through a power switch 7. An output port SCK of the CPU 2 outputs synchronizing clocks in serial data communication, and is connected in a row to one of the lens contacts LCLK, a synchronizing clock input terminal CK of the EEPROM 3 and a synchronizing clock input terminal CLK of the LCD driver 4. An input port SI is a data input port for the serial data communication. A line connected to the input port SI is a data communication line, and connected in a row to one of the lens contacts LIO, one terminal of an analog switch 6 and a data output terminal DO of the EEPROM 3.

An output port SO is a data output port for the serial data communication, and connected in a row to another terminal of the analog switch 6, a data input terminal DI of the EEPROM 3 and a terminal DATA of the LCD driver 4. An output port P1, an input/output port P2, an output port P3 and an output port P4 are connected to a control terminal of the analog switch 6, one of the lens contacts LHS, an enable input terminal CE of the EEPROM 3 and a data input selection terminal CS of the LCD driver 4, respectively. The LCD driver 4 and a display LCD 5 are connected through a plurality of wires.

The interchangeable lens 101 has a CPU 102, (data communication device) and a power supply terminal VCC and a GND terminal of the CPU 102 are connected to contacts corresponding to the lens contacts LVCC and LGND of the camera body 1. A synchronizing clock input port SCK and a data input/output port SIO of the CPU 102 in the serial data communication are connected to contacts corresponding to the lens contacts LCLK and LIO of the camera body 1. An input/output port PX of the CPU 102 is connected to a contact corresponding to the lens contact LHS of the camera body 1.

Operations of the camera body 1 and the interchangeable lens 101 will now be described with reference to flowcharts of a program of the CPU 2 in the camera body 1 and timing charts showing waveforms of the terminals shown in FIGS. 3 and 4.

Figure 1A:
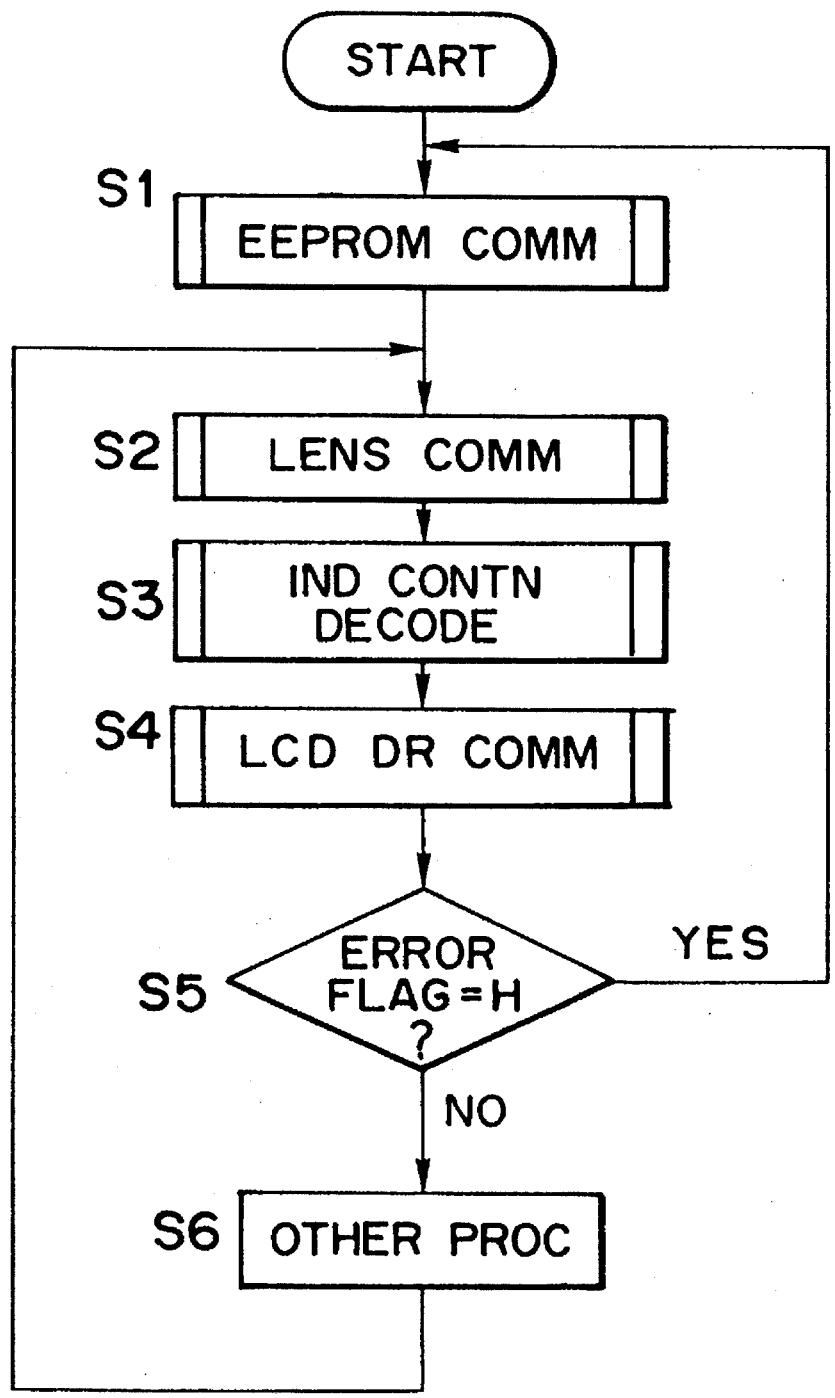
FIGS. 1A to 1E are flowcharts explaining operations of an embodiment of the present invention.
Figure 1B:
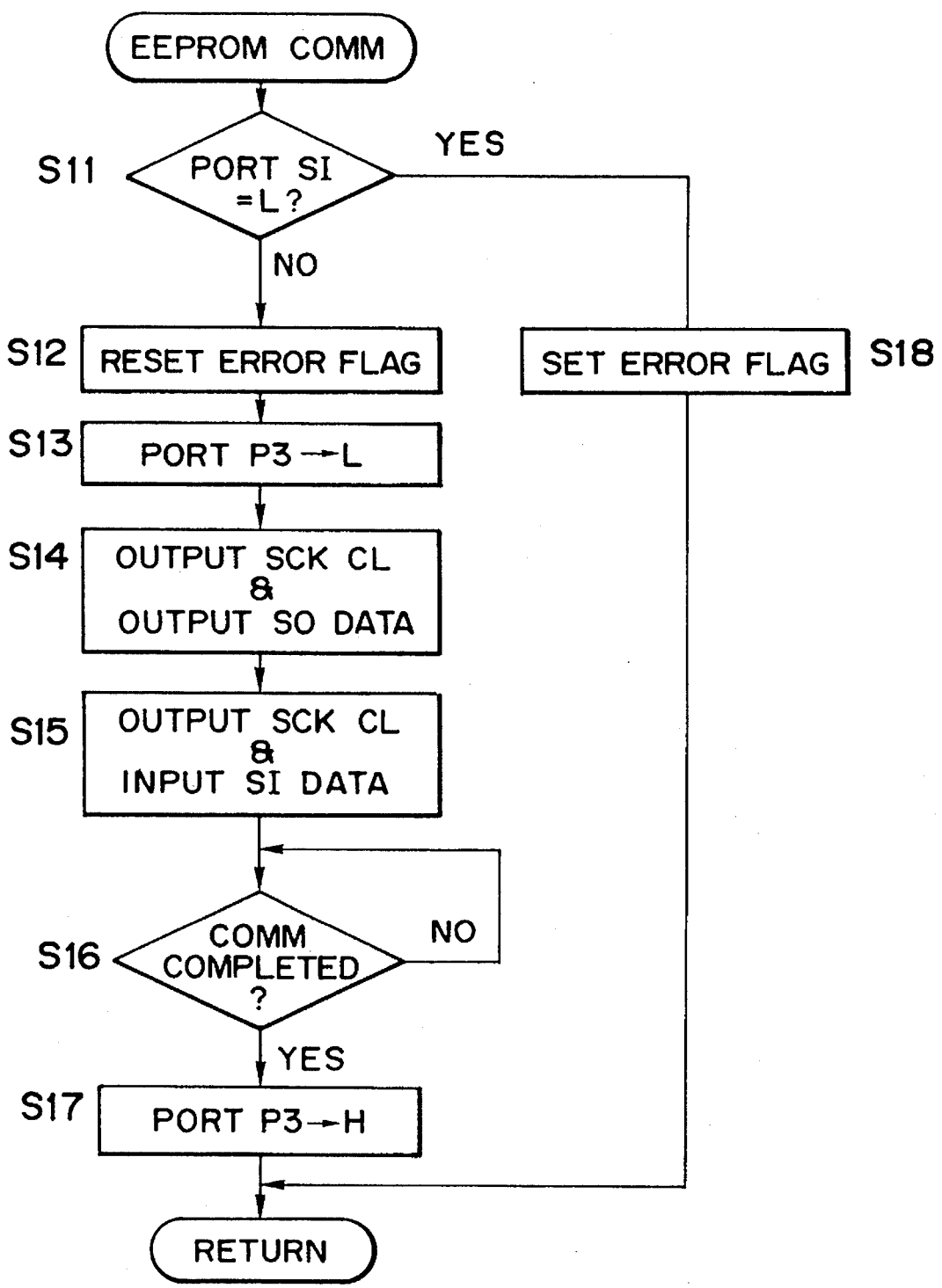
Figure 3:
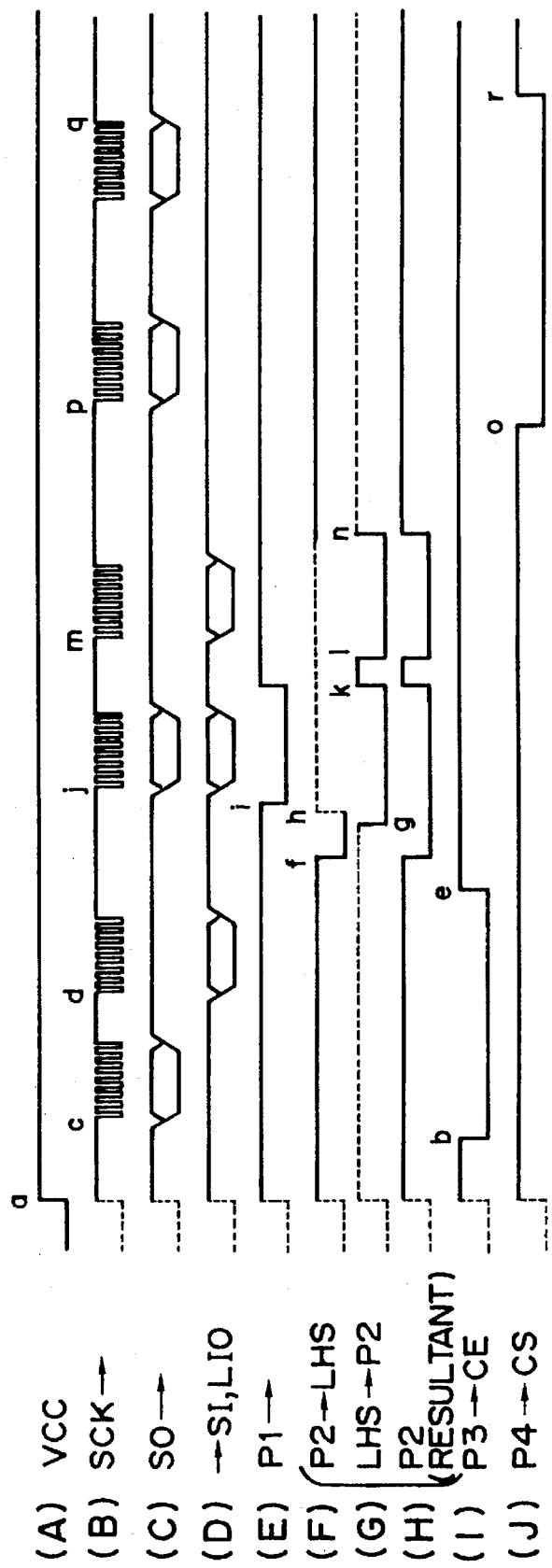
FIGS. 3(A) to 3(J) and FIGS. 4(A) to 4(J) are timing charts explaining the operations of the embodiment.

When the power is turned on and the CPU 2 in the camera body 1 starts to execute the program (point a shown in FIG. 3 (A)), an EEPROM communication subroutine is executed in Step S1 shown in FIG. 1A. This subroutine is a process shown in FIG. 1B. The voltage level of the serial data input port SI is checked in Step S11, and if the level is the L level, an error flag is set in Step S18 and the subroutine is immediately ended.

If the port SI is on the H level in Step S11, the error flag is reset in Step S12, and the actual EEPROM communication is started. In other words, it is detected whether or not the lens contact LIO is short-circuited to the housing potential of the camera (GND), and if the short-circuit is detected, a flag for indicating a malfunction is set and the communication with the EEPROM is not executed. The timing chart shown in FIG. 3 shows the case in which no malfunction is detected in this check, and the level of the port SI immediately after the point a shown in FIG. 3(A) is the H level.

In this case, after the error flag is reset in Step S12, the level of the output port P3 of the CPU 2 is lowered to the L level in Step S13 and the EEPROM 3 is informed of the start of the data communication (point b shown in FIG. 3 (I)). Then synchronizing clocks are output from the port SCK of the CPU 2, while a requested address is serially output from the port SO in Step S14 (point c shown in FIG. 3(B) and point c shown in FIG. 3(C)). When 1-byte transmission is completed, synchronizing clocks are output from the port SCK of the CPU 2, while data transmitted from the EEPROM is serially input to the port SI (point d shown in FIG. 3 (B) and point d shown in FIG. 3 (D)).

The data read from the EEPROM 3 include the numerical value of a film counter to be displayed, an operation mode of a camera which is set immediately before the communication, an adjustment parameter peculiar to each camera and stored when the camera is shipped, and so on. Although 1-byte data is transmitted and received in this embodiment, the transmission in Step S14 and the receiving in Step S15 are sometimes repeated a plurality of times in accordance with the necessary amount of data.

If it is determined in Step S16 that the data receiving is completed, the level of the output port P3 of the CPU 2 is returned to the H level so as to inform the EEPROM 3 of the completion of the communication in Step S17 (the point e shown in FIG. 3(I)), and the subroutine is ended.

Figure 1C:
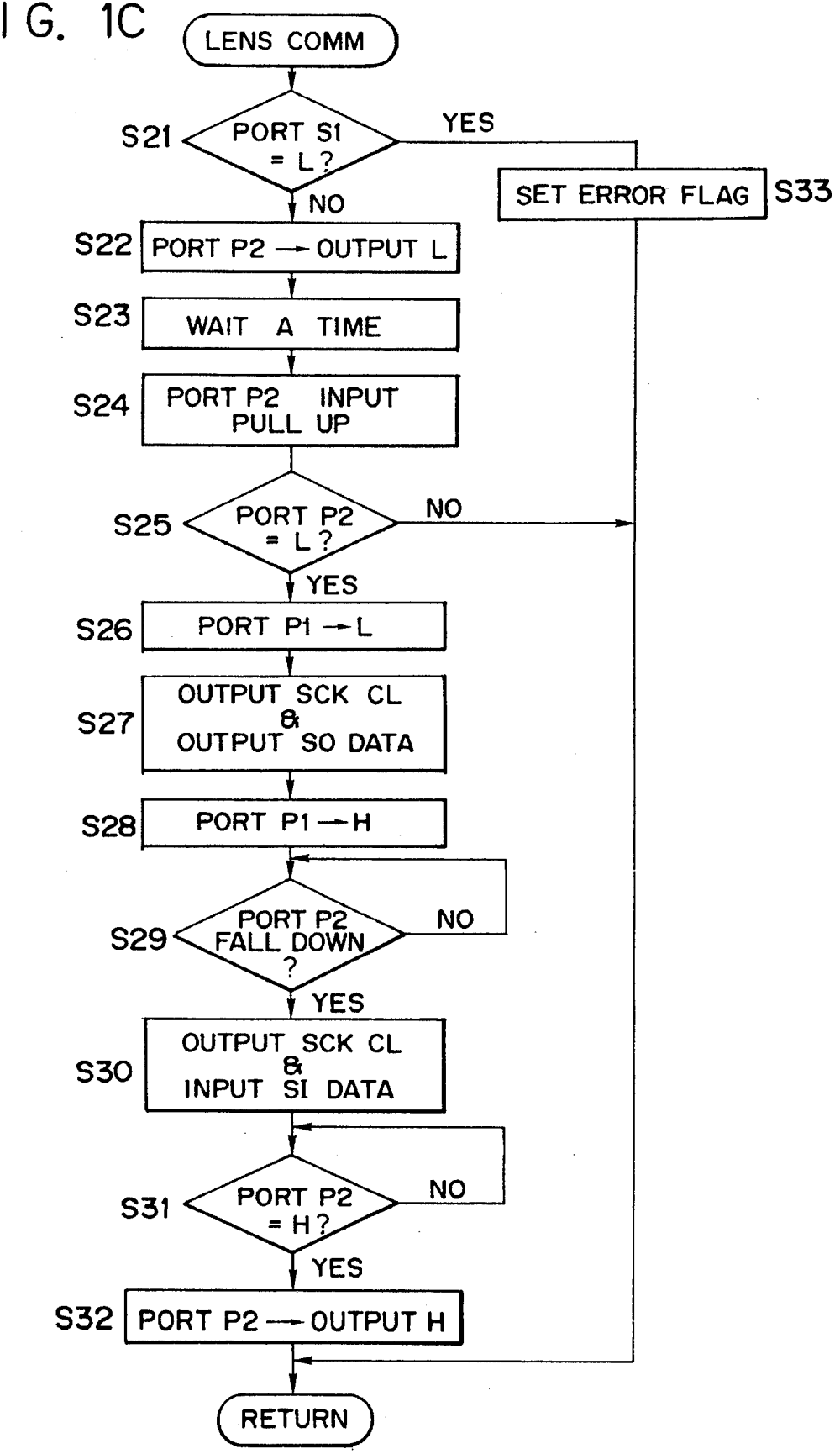

Subsequently, a subroutine of lens communication is executed in Step S2 shown in FIG. 1A. The flowchart of the lens communication subroutine is shown in FIG. 1C. The voltage level of the serial data input port SI is checked in Step S21, and if the level is the L level, an error flag is set in Step S33 and this subroutine is immediately returned. If the port SI is on the H level, steps subsequent to Step S22 are executed and an actual lens communication is started.

In other words, it is detected whether or not the lens contact LIO is short-circuited to the housing potential of the camera (GND), and if the short circuit is detected, a flag for indicating a malfunction is set, and the subsequent communication, that is, the communication with the lens is not performed. The lens communication is executed as follows.

In Step S22, an output of the L level is given from the input/output port P2 of the CPU 22 in an input mode (point f shown in FIG. 3 (F), and a wait for a predetermined time is taken in Step S23. In the timing chart shown in FIG. 3, since the relationship between the input and the output of the voltage waveform of a line from the port P2 to the lens contact LHS is sometimes changed, an output from the port P2 (P2→LHS shown in FIG. 3(F)) and an output from the lens contact LHS (LHS→P2 shown in FIG. 3(G)) are separately shown, and furthermore a final voltage waveform (P2 (resultant) shown in FIG. 3) determined by both the outputs is given. A broken part of the waveform P2→LHS shows the state in which the port P2 is pulled up in an input mode, and broken parts of the waveform LHS→P2 show the state in which the CPU port PX of the lens is in an input mode.

When the interchangeable lens is attached, the CPU 102 of the lens detects that the port PX corresponding to the lens contact LHS at the point g shown in FIG. 3(G) is on the L level, puts the input/output port P2 into an input mode and output a signal of the L level. After waiting for a predetermined time, the CPU 2 of the camera body 1 puts the input/output port P2 into the input mode in Step S24 (point h shown in FIG. 3(F)), and checks the level of the port P2 in Step S25. Since the timing chart shown in FIG. 3 shows the case in which the interchangeable lens is attached, the port P2 is on the L level and Step S26 is executed.

Figure 4:
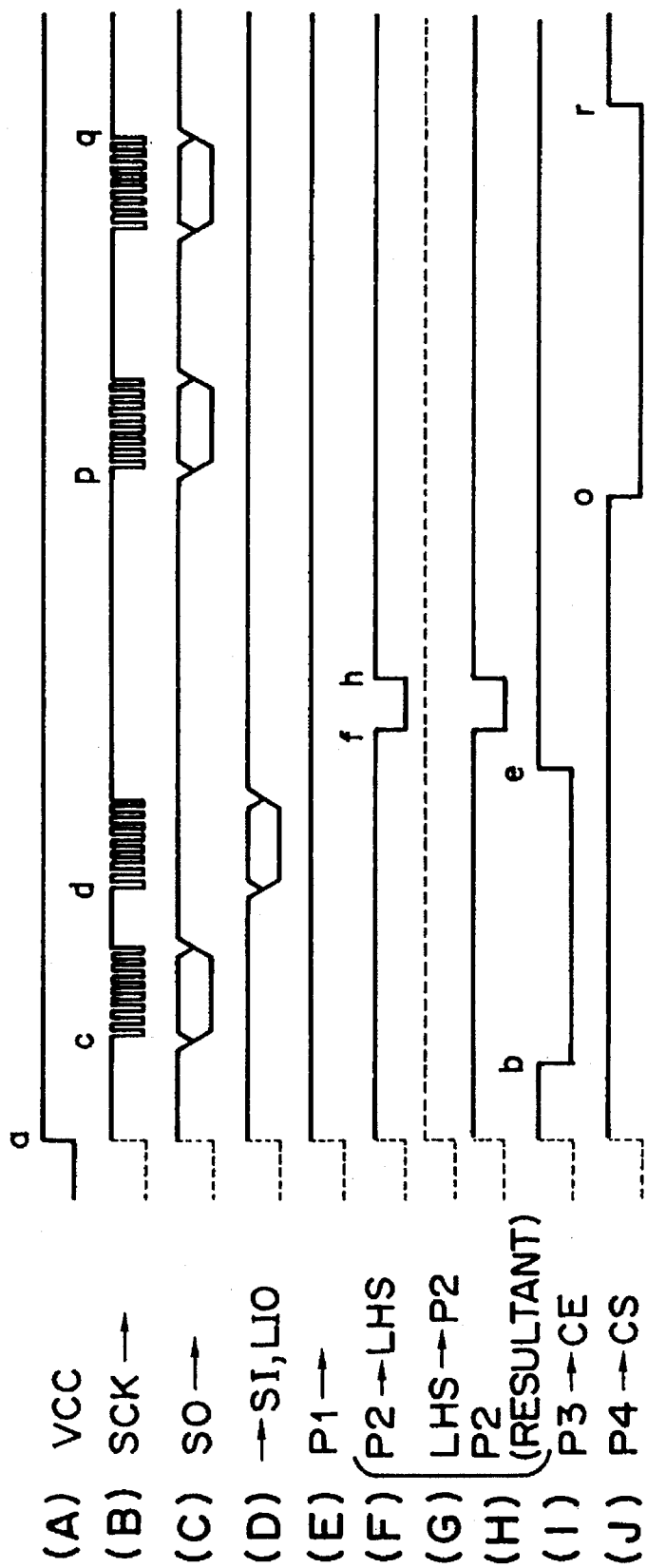

However, if the interchangeable lens is not attached, the terminal PX of the lens shown in the Waveform LHS→P2 is always open as shown in the timing chart shown in FIG. 4 (G), and therfore, the P2 at the point h is on the H level. In this case, it is determined in Step S25 that the interchangeable lens is not attached, this subroutine is immediately returned, and the communication operation with the lens is not carried out.

On the other hand, if Step S26 is executed, an actual lens communication operation is performed. First, the input port P1 of the CPU 1 is put into the L level (point i shown in FIG. 3(E)), the analog switch 6 is actuated, and the output port SO of the CPU 2 is connected to the lens contact LIO. Then, synchronizing clocks are output from the port SCK of the CPU 2, while a requested address is serially output from the port SO in Step S27 (point j shown in FIG. 3(B)). When the transmission is completed, the output port P1 is returned to the H level and the analog switch 6 is turned off in Step S28.

When the lens confirms that a 1-byte address signal is received, the port PX, that is, the contact corresponding to the lens contact LHS is raised to the H level (point k shown in FIG. 3 (G)), and lowered to the L level again (point 1 shown in FIG. 3(G)), and a wait for synchronizing clocks to transmit data is taken. The CPU 2 of the camera body waits for the fall of the port P2 in Step S29. When the port P2 falls down, synchronizing clocks are output from the port SCK of the CPU 2 and data transmitted from the lens is serially input from the port SI in Step S30 (point m shown in FIG. 3(B)).

The data read from the lens include the aperture value, the focal length, drive parameters concerning automatic focusing, and so on. Although 1-byte data is exchanged in this embodiment, the transmission and receiving in Steps S26 to S30 are sometimes repeated a plurality of times in accordance with the necessary amount of data. Since the port PX of the lens corresponding to the lens contact LHS is returned into the input mode when the data transmission is completed, the level of the port P2 is raised to the H level by the pull-up of the CPU 2 in the camera body (point n shown in FIG. 3 (G)). In response to the detection of the rise in Step S31, the input/output port P2 is returned into the input mode and a signal of the H level is output in Step S32, and this subroutine is returned.

Figure 1D:
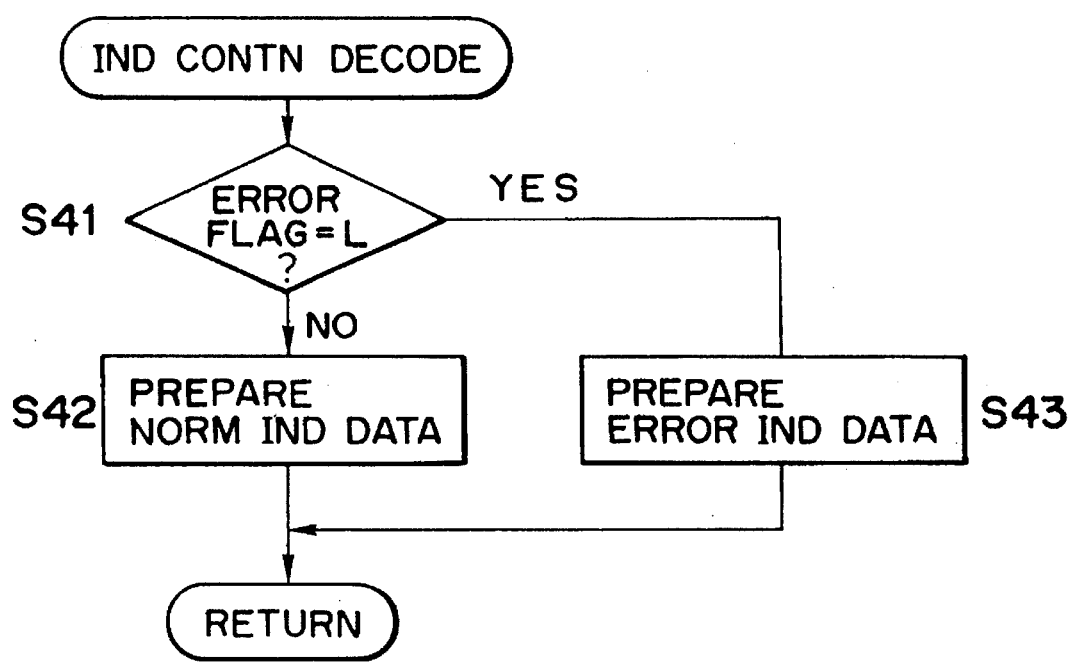

Subsequently, an indication content decode subroutine in Step S3 shown in the flowchart of FIG. 1A is carried out. A flowchart of this subroutine is shown in FIG. 1D. It is determined in Step S41 whether an error flag is on the H or L level. If the error flag is on the H level, the content to be normally indicated is determined in Step S42 based on the data read from the EEPROM and the interchangeable lens and set information concerning the camera set by an unillustrated means, and decoded, thereby preparing data to be transmitted to an LCD driver 4 so as to display the determined indication content in an indication LCD 5.

Figure 1E:
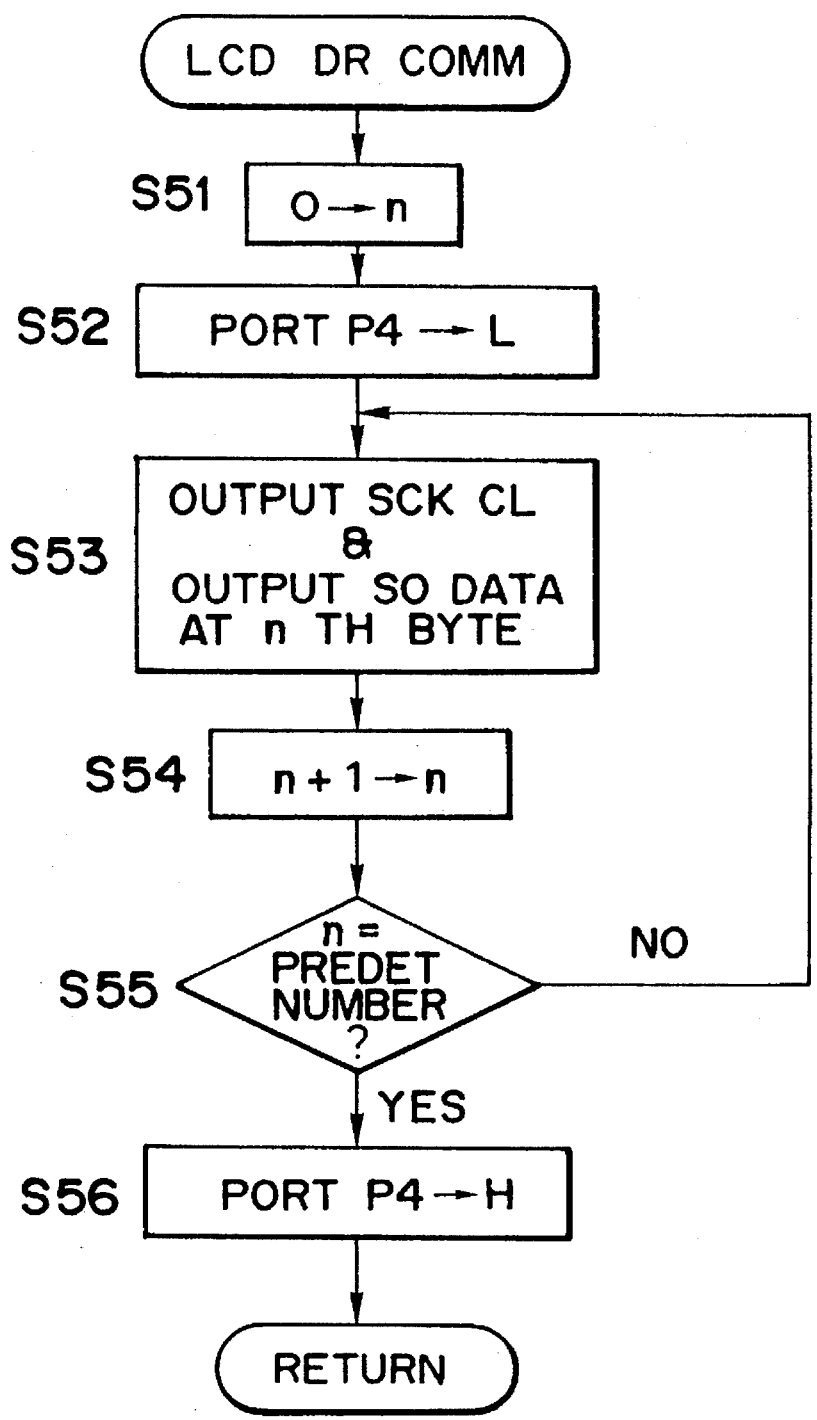

If the error flag is on the L level, characters "ERROR" for informing the user of a malfunction are displayed and decoded, and data to be transmitted to the LCD driver 4 so as to display the determined indication content in the indication LCD 5 is prepared in Step S43. After the process in Step S42 or S43, a returning process is performed, In the flowchart shown in FIG. 1A, an LCD driver communication subroutine in Step S4 is carried out. The flowchart of this subroutine is shown in FIG. 1E. 0 is stored in a variable n as a counter of the number of data in Step S51, and the output port P4 is lowered to the L level in Step S52 (point o shown in FIG. 3(J)). When the LCD driver 4 inputs 0 from the CS terminal, a wait for a serial receiving of indication data is taken. Synchronizing clocks are output from the port SCK to the CLK terminal of the LCD driver 4, while the data on the indication content is serially output from the port SO to the data terminal DATA of the LCD driver 4 in Step S53 (point p shown in FIG. 3(B)).

When the transmission of 1-byte data is completed, 1 is added to the variable n in Step S54, and it is checked in Step S55 whether or not n reaches a predetermined value. The predetermined value corresponds to the total number of data to be transmitted to the LCD driver 4. It is determined in Step S55 whether or not the transmission of all the data to be transmitted is completed. If the variable n does not coincide with the predetermined number, the next data transmission is performed in Step S53 again. After such repeated data transmission, when it is determined in Step S55 that the all the data is transmitted (point q shown in FIG. 3(B)), the port P4 is returned into the H level in Step S56 (point r shown in FIG. 3(J)), and a return process is executed.

Then, it is determined in Step S5 shown in FIG. 1A whether or not an error flag for indicating a malfunction of the lens contact LIO is on the H level. If the error flag is on the H level, the communication with the EEPROM is tried again in Step S1. If the error flag is on the L level, other processes for operating some functions of the camera are performed in Step S6, and a loop returning to Step S2 is executed. Since the shutter release related to a photographing operation is controlled in the other processes, if the error flag is on the H level due to the malfunction of the lens contact, the other processes are not performed and the shutter release is prohibited.

If a malfunction occurs in the lens contact, the malfunction is detected in the EEPROM communication subroutine and the lens communication subroutine, respectively, previous to the photographing operation, and no communication operation is performed. Furthermore, a warning is given to the user by using the indication LCD, and the shutter of the camera is prohibited from being released.

Although the EEPROM is given as an example of the internal units of the camera body in the above embodiment, other data transmission devices, for example, an I/O extension unit of a CPU and CPUs other than the main CPU in the use of a plurality of CPUs, can obtain the same advantages by similarly designing communication subroutines with the data transmission devices, respectively. Furthermore, although the interchangeable lens is given as an example of the external accessories in this embodiment, for example, data transmission contacts for a speedlight, a data back, a personal computer or an electronic notebook, may be used as contacts for the external accessories. If these contacts use communication lines in common with other units, a malfunction of each of the communication lines can be detected in the same manner as in the above embodiment, and thus the same advantages can be obtained.

If a malfunction of a contact is indicated, the malfunction is sometimes repaired by cleaning the contact and performing communication again. If the malfunction is not repaired by the cleaning, it is also possible to protect a battery and a circuit by separating the battery and the circuit. Furthermore, although it is mentioned that the malfunction indication is performed before communication, data cannot be sometimes exchanged during the communication, resulting in a malfunction. In this case, the malfunction may be also indicated in the display.

As described above, according to the present invention, even if lines for data communication between a control device in the camera body, such as a CPU, and an external accessory and an internal unit are designed to be used in common, it is possible to prevent erroneous control by the camera due to the transmission and receiving of incorrect data, which is caused in the case where one or some of the communication lines are short-circuited by an external cause.

Furthermore, since the present invention can positively warn the user of a malfunction of an external contact, the user can promptly make an effort to eliminate a cause of the malfunction, and the malfunction is sometimes repaired by the effort.

I claim:

1. A camera data communication system for performing data communication operations (a) between a detachable external accessory and a camera body through a data communication line, and for performing data communication operations (b) between a camera data communication device and a circuit unit in the camera body through the data communication line, comprising:

voltage level detecting means for generating a malfunction signal indicating a malfunction when the voltage level of the data communication line is abnormal, before a data communication operation (b) between said data communication device and said circuit unit through said data communication line is started; and control means for inhibiting data communication operations (a) and (b) through said data communication line in response to said malfunction signal.

2. A camera data communication system according to claim 1, further comprising warning means for warning a user in response to said malfunction signal.

3. A camera data communication system according to claim 1, further comprising release prohibition means for prohibiting a shutter release operation of said camera in response to said malfunction signal.

4. A camera data communication system according to claim 1, wherein said external accessory is an interchangeable lens.

5. A camera data communication system according to claim 1, wherein said voltage level detection means generates said malfunction signal when said data communication line is short circuited so that the voltage level thereof is grounded.

6. A camera data communication system according to claim 1, wherein said circuit unit is memory means capable of reading therefrom and writing thereto.

7. A camera data communication system for performing data communication operations (a) between a detachable external accessory and a camera body through a data communication line, and for performing data communication operations (b) between a camera data communication device and a circuit unit in the camera body through the data communication line, comprising:

sequence control means for controlling the starting of a data communication operation (a) between said external accessory and said camera body through said data communication line after the completion of a data communication operation (b) between said camera data communication device and said circuit unit through said data communication line;

voltage level detecting means for generating a malfunction signal indicating a malfunction when the voltage level of the data communication line is abnormal, before a data communication operation (b) between said data communication device and said circuit unit through said data communication line is started; and control means for inhibiting data communication operations (a) and (b) through said data communication line in response to said malfunction signal.

8. A data communication system for performing data communication operations between a detachable external accessory and a camera body, wherein said external accessory has a first data communication device, and said camera body has a second data communication device for performing data communication operations (a) with said first data communication device through a data communication line;

a circuit unit separate from the detachable external accessory for performing data communication operations (b) with said second data communication device through said data communication line;

voltage level detecting means for detecting the voltage level of said data communication line, before a data communication operation (b) between said circuit unit and said second data communication device through said data communication line is started, and for generating a malfunction signal indicating a malfunction when the detected voltage level of said data communication line is abnormal; and control means for inhibiting data communication operations (b) between said circuit unit and said second data communication device through said data communication line in response to said malfunction signal.

9. A camera data communication system for performing data communication operations between a detachable external accessory and a camera body through a data communication line, comprising:

a circuit unit in the camera body for using the data communication line to perform a data communication to the system;

voltage level detecting means for detecting whether a voltage level of the data communication line is normal or abnormal, before a data communication operation between the system and the circuit unit is started, and generating a malfunction signal indicating a malfunction if the voltage level is abnormal; and control means for inhibiting data communication operations to the circuit unit in response to the malfunction signal from the voltage level detecting means.

10. A camera data communication system according to claim 9, further comprising warning means for warning a user in response to the malfunction signal.

11. A camera data communication system according to claim 10, wherein the warning means includes indicating means for recognizably indicating a generation of malfunction in response to the malfunction signal.

12. A camera data communication system according to claim 11, wherein the indicating means includes an LCD for indicating.

13. A camera data communication system according to claim 9, further comprising release prohibition means for prohibiting a shutter release operation of the camera in response to the malfunction signal.

14. A camera data communication system according to claim 9, wherein the external accessory is an interchangeable lens.

15. A camera data communication system according to claim 9, wherein the external accessory is at least one of a speedlight, a data back, a personal computer and an electronic notebook.

16. A camera data communication system according to claim 9, wherein the voltage level detection means generates the malfunction signal when the data communication line is short circuited so that the voltage level thereof is grounded before a data communication operation between the system and the circuit unit is started.

17. A camera data communication system according to claim 9, wherein the circuit unit is memory means capable of reading therefrom and writing thereto.

18. A camera data communication system for performing data communication operations between a detachable external accessory and a camera body through a data communication line, comprising:

a circuit unit in the camera body for using the data communication line to perform a data communication to the system;

sequence control means for controlling the starting of a data communication operation between the system and the external accessory through the data communication line after the completion of a data communication operation between the system and the circuit unit through the data communication line;

voltage level detecting means for generating a malfunction signal indicating detection of a malfunction when a voltage level of the data communication line is abnormal, before a data communication operation between the system and the circuit unit is started; and control means for inhibiting data communication operations between the system and the circuit unit in response to the malfunction signal from the voltage level detecting means.

19. A camera data communication system according to claim 18, further comprising warning means for warning a user in response to the malfunction signal.

20. A camera data communication system according to claim 19, wherein the warning means includes indicating means for recognizably indicating a generation of malfunction in response to the malfunction signal.

21. A camera data communication system according to claim 20, wherein the indicating means includes an LCD for indicating.

22. A camera data communication system according to claim 18, further comprising release prohibition means for prohibiting a shutter release operation of the camera in response to the malfunction signal.

23. A camera data communication system according to claim 18, wherein the external accessory is an interchangeable lens.

24. A camera data communication system according to claim 18, wherein the external accessory is at least one of a speedlight, a data back, a personal computer and an electronic notebook.

25. A camera data communication system according to claim 18, wherein the voltage level detection means generates the malfunction signal when the data communication line is short circuited so that the voltage level thereof is grounded before a data communication operation between the system and the circuit unit is started.

26. A camera data communication system according to claim 18, wherein the circuit unit is memory means capable of reading therefrom and writing thereto.

27. A camera data communication system for performing data communication operations between a detachable external accessory and a camera body through a data communication line, comprising:

a first data communication device provided in one of the camera body and the external accessory;

a second data communication device provided in the other of the camera body and the external accessory;

at least one circuit unit provided in the other of the camera body and the external accessory, for communicating with the second communication devices voltage level detecting means provided in the other of the camera body and the external accessory, for detecting a voltage level of the data communication line before a communication operation between the second communication device and the circuit unit is started, and generating a malfunction signal indicating detection of a malfunction when a voltage level of the data communication line is abnormal; and control means provided in the other of the camera body and the external accessory, for inhibiting communication operations between the second communication device and the circuit unit in response to the malfunction signal from the voltage level detecting means.

28. A camera data communication system according to claim 27, further comprising warning means for warning a user in response to the malfunction signal.

29. A camera data communication system according to claim 28, wherein the warning means includes indicating means for recognizably indicating a generation of malfunction in response to the malfunction signal.

30. A camera data communication system according to claim 29, wherein the indicating means includes an LCD for indicating.

31. A camera data communication system according to claim 27, further comprising release prohibition means for prohibiting a shutter release operation of the camera in response to the malfunction signal.

32. A camera data communication system according to claim 27, wherein the external accessory is an interchangeable lens.

33. A camera data communication system according to claim 27, wherein the external accessory is at least one of a speedlight, a data back, a personal computer and an electronic notebook.

34. A camera data communication system according to claim 27, wherein the voltage level detection means generates the malfunction signal when the data communication line is short circuited so that the voltage level thereof is grounded before a communication operation between the second communication device and the circuit unit is started.

35. A camera data communication system according to claim 27, wherein the circuit unit is memory means capable of reading therefrom and writing thereto.

36. A camera data communication method of performing data communication operations (a) between a detachable external accessory and a camera body through a data communication line, and of performing data communication operations (b) between a camera data communication device and a circuit unit in the camera body through the data communication line, comprising the steps of:

detecting a voltage level of said data communication line before a data communication operation (b) between said data communication device and said circuit unit through said data communication line is started;

generating a malfunction signal indicating a malfunction when the voltage level of the data communication line is abnormal; and inhibiting data communication operations (a) and (b) through said data communication line in response to said malfunction signal.

37. A camera data communication method of performing data communication operations (a) between a detachable external accessory and a camera body through a data communication line, and of performing data communication operations (b), before the data communication operations (a), between a camera data communication device and a circuit unit in the camera body through the data communication line, comprising the steps of:

detecting a voltage level of said data communication line before a data communication operation (b) between said data communication device and said circuit unit through said data communication line is started;

generating a malfunction signal indicating a malfunction when the voltage level of the data communication line is abnormal; and inhibiting data communication operations (a) and (b) through said data communication line in response to said malfunction signal.

38. A data communication method of performing data communication operations in a system including a detachable external accessory having a first data communication device, and a camera body having a second data communication device for performing data communication operations (a) with said first data communication device through a data communication line, and including a circuit unit separate from the external accessory for performing data communication operations (b) with said second data communication device through said data communication line, comprising the steps of:

detecting a voltage level of said data communication line before a data communication operation (b) between said circuit unit and said second data communication device through said data communication line is started;

generating a malfunction signal indicating a malfunction when the voltage level of the data communication line is abnormal; and inhibiting data communication operations (b) through said data communication line in response to said malfunction signal.

39. A data communication method in a system wherein data communication operations are performed between a detachable accessory and a data communication device of a camera body through a data communication line, and wherein the camera body has a circuit unit using the data communication line for performing data communication operations with said data communication device, comprising the steps of:

detecting a voltage level of said data communication line before a data communication operation between said circuit unit in said camera body and said data communication device through said data communication line is started, and generating a malfunction signal indicating a malfunction if the voltage level of the data communication line is abnormal; and inhibiting data communication operations of said circuit unit through said data communication line in response to said malfunction signal.

40. A data communication method in a system wherein data communication operations are performed between a detachable accessory and a data communication device of a camera body through a data communication line, and wherein the camera body has a circuit unit using the data communication line for performing data communication operations with said data communication device, comprising the steps of:

controlling the sequencing of data communication operations so that a data communication operation between said data communication device of said camera body and said external accessory through the data communication line is started after completion of a data communication operation between said data communication device of said camera body and said circuit unit through the data communication line;

detecting a voltage of said data communication line before starting of a data communication operation between said data communication device of said camera body and said circuit unit through the data communication line;

generating a malfunction signal indicating a malfunction when the voltage level of the data communication line is abnormal; and inhibiting data communication operations between said data communication device and said circuit unit through said data communication line in response to said malfunction signal.

41. A camera data communication system for performing data communication operations between a detachable external accessory and a camera body through a data communication line, comprising:

a first data communication device provided in one of the camera body and the external accessory;

a second data communication device provided in the other of the camera body and the external accessory;

at least one circuit unit provided in the other of the camera body and the external accessory, for communicating with the second communication device;

a detecting circuit provided in the other of the camera body and the external accessory, for detecting a voltage level of the data communication line before a communication operation between the second communication device and the circuit unit is started, and generating a malfunction signal indicating detection of a malfunction when a voltage level of the data communication line is abnormal; and a control circuit provided in the other of the camera body and the external accessory, for inhibiting communication operations between the second communication device and the circuit unit in response to the malfunction signal from the voltage level detecting device.

42. A camera data communication system for performing data communication operations (a) between a detachable external accessory and a camera body through a data communication line, and for performing data communication operations (b) between a camera data communication device and a circuit unit in the camera body through the data communication line, comprising:

a voltage level detector which generates a malfunction signal indicating a malfunction when the voltage level of the data communication line is abnormal, before a data communication operation (b) between said data communication device and said circuit unit through said data communication line is started; and a controller which inhibits data communication operations (a) and (b) through said data communication line in response to said malfunction signal.

43. A camera data communication system for performing data communication operations (a) between a detachable external accessory and a camera body through a data communication line, and for performing data communication operations (b) between a camera data communication device and a circuit unit in the camera body through the data communication line, comprising:

a sequence controller which controls the starting of a data communication operation (a) between said external accessory and said camera body through said data communication line after the completion of a data communication operation (b) between said camera data communication device and said circuit unit through said data communication line;

a voltage level detector which generates a malfunction signal indicating a malfunction when the voltage level of the data communication line is abnormal, before a data communication operation (b) between said data communication device and said circuit unit through said data communication line is started; and a controller which inhibits data communication operations (a) and (b) through said data communication line in response to said malfunction signal.

44. A data communication system for performing data communication operations between a detachable external accessory and a camera body, wherein said external accessory has a first data communication device, and said camera body has a second data communication device for performing data communication operations (a) with said first data communication device through a data communication line;

a circuit unit separate from the detachable external accessory for performing data communication operations (b) with said second data communication device through said data communication line;

a voltage level detector which detects the voltage level of said data communication line, before a data communication operation (b) between said circuit unit and said second data communication device through said data communication line is started, and generates a malfunction signal indicating a malfunction when the detected voltage level of said data communication line is abnormal; and a controller which inhibits data communication operations (b) between said circuit unit and said second data communication device through said data communication line in response to said malfunction signal.

45. A camera data communication system for performing data communication operations between a detachable external accessory and a camera body through a data communication line, comprising:

a circuit unit in the camera body for using the data communication line to perform a data communication to the system;

a voltage level detector which detects whether a voltage level of the data communication line is normal or abnormal, before a data communication operation between the system and the circuit unit is started, and generates a malfunction signal indicating a malfunction if the voltage level is abnormal; and a controller which inhibits data communication operations to the circuit unit in response to the malfunction signal from the voltage level detector.

46. A camera data communication system for performing data communication operations between a detachable external accessory and a camera body through a data communication line, comprising:

a circuit unit in the camera body for using the data communication line to perform a data communication to the system;

a sequence controller which controls the starting of a data communication operation between the system and the external accessory through the data communication line after the completion of a data communication operation between the system and the circuit unit through the data communication line;

a voltage level detector which generates a malfunction signal indicating detection of a malfunction when a voltage level of the data communication line is abnormal, before a data communication operation between the system and the circuit unit is started; and a controller which inhibits data communication operations between the system and the circuit unit in response to the malfunction signal from the voltage level detector.

47. A camera data communication system for performing data communication operations between a detachable external accessory and a camera body through a data communication line, comprising:

a first data communication device provided in one of the camera body and the external accessory;

a second data communication device provided in the other of the camera body and the external accessory;

at least one circuit unit provided in the other of the camera body and the external accessory, for communicating with the second data communication device;

a voltage level detector provided in the other of the camera body and the external accessory, which detects a voltage level of the data communication line before a communication operation between the second data communication device and the circuit unit is started, and generates a malfunction signal indicating detection of a malfunction when a voltage level of the data communication line is abnormal; and a controller provided in the other of the camera body and the external accessory, which inhibits communication operations between the second data communication device and the circuit unit in response to the malfunction signal from the voltage level detector.

* * * * *